(12) United States Patent
Luebke et al.

(10) Patent No.: US 10,003,185 B2
(45) Date of Patent: Jun. 19, 2018

(54) ELECTRICAL DEVICE WITH POWER QUALITY EVENT PROTECTION AND ASSOCIATED METHOD

(71) Applicant: EATON CORPORATION, Cleveland, OH (US)

(72) Inventors: Charles John Luebke, Hartland, WI (US); Birger Pahl, Milwaukee, WI (US); Steven Christopher Schmalz, Franklin, WI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 186 days.

(21) Appl. No.: 14/570,036

(22) Filed: Dec. 15, 2014

(65) Prior Publication Data

US 2016/0172840 A1    Jun. 16, 2016

(51) Int. Cl.
| | | |
|---|---|---|
| H02H 3/20 | (2006.01) | |
| H02H 1/00 | (2006.01) | |
| H02H 3/08 | (2006.01) | |
| H02H 3/16 | (2006.01) | |
| H02H 3/22 | (2006.01) | |
| H02H 3/24 | (2006.01) | |
| H02H 3/44 | (2006.01) | |
| H02H 3/46 | (2006.01) | |
| H02H 3/50 | (2006.01) | |

(52) U.S. Cl.
CPC ........... *H02H 3/207* (2013.01); *H02H 1/0015* (2013.01); *H02H 3/08* (2013.01); *H02H 3/16* (2013.01); *H02H 3/20* (2013.01); *H02H 3/22* (2013.01); *H02H 3/24* (2013.01); *H02H 3/44* (2013.01); *H02H 3/46* (2013.01); *H02H 3/50* (2013.01)

(58) Field of Classification Search
USPC .......................................... 257/147; 361/111
See application file for complete search history.

(56) References Cited

U.S. PATENT DOCUMENTS

| | | | | |
|---|---|---|---|---|
| 6,031,743 | A * | 2/2000 | Carpenter | H02J 1/102 307/48 |
| 2009/0086387 | A1* | 4/2009 | Engel | H02H 1/0015 361/42 |
| 2009/0212975 | A1* | 8/2009 | Ausman | G01R 31/3277 340/945 |
| 2010/0324845 | A1* | 12/2010 | Spanier | G01R 19/2513 702/62 |
| 2013/0099566 | A1* | 4/2013 | Pfitzer | H02J 3/14 307/29 |
| 2013/0187473 | A1* | 7/2013 | Deboy | H02M 7/49 307/82 |
| 2014/0071720 | A1* | 3/2014 | Ouyang | H02H 7/1213 363/50 |

* cited by examiner

*Primary Examiner* — Marcos D Pizarro
*Assistant Examiner* — Lawrence Tynes, Jr.
(74) *Attorney, Agent, or Firm* — Eckert Seamans

(57) ABSTRACT

An electrical device includes a first terminal structured to electrically connect to a power source; a second terminal structured to electrically connect to a load; a voltage sensor electrically connected to a point between the first and second terminals and being structured to sense a voltage at the point between the first and second terminals; a switch electrically connected between the first terminal and the second terminal; and a control unit structured to detect a power quality event in the power flowing between the first and second terminals based on the sensed voltage and to control a state of the switch based on the detected power quality event.

16 Claims, 3 Drawing Sheets

ELECTRICAL DEVICE WITH POWER QUALITY EVENT PROTECTION AND ASSOCIATED METHOD

BACKGROUND

Field

The disclosed concept relates generally to electrical devices, and more particularly, to electrical devices that provide protection from power quality events. The disclosed concept is also related to providing protection from power quality events.

Background Information

There are various types of power quality events that occur on power distribution networks and conductors that can cause damage to loads and associated power converters. Some examples of such power quality events are transients, interruptions, sags, swells, waveform distortions, voltage fluctuation, and frequency variations.

Transients are impulse type overvoltage events, while swells are longer overvoltage events. Both transients and swells can damage a load. Surge protection devices are typically used to protect against transients. However, surge protection devices do not protect against swells. In fact, the surge protection device itself may be damaged by swells.

An uninterruptible power supply (UPS) or a power conditioner can limit the amount of voltage to a load, which offers a degree of protection from swells. A UPS or power conditioner can also protect against interruptions and sags. However, a UPS or power conditioner is an expensive device, and as such, is usually only used for critical loads that need continuous power.

There is a need for electrical devices that provide protection from power quality events. There is also a need for methods of providing protection from power quality events.

SUMMARY

These needs and others are met by embodiments of the disclosed concept, which are directed to an electrical device including control unit that is structured to detect a power quality event and to open a switch based on the detected power quality event.

In accordance with aspects of the disclosed concept, an electrical device comprises: a first terminal structured to electrically connect to a power source; a second terminal structured to electrically connect to a load; a voltage sensor electrically connected to a point between the first and second terminals and being structured to sense a voltage at the point between the first and second terminals; a switch electrically connected between the first terminal and the second terminal; and a control unit structured to detect a power quality event in the power flowing between the first and second terminals based on the sensed voltage and to control a state of the switch based on the detected power quality event.

In accordance with other aspects of the disclosed concept, a method of providing protection from power quality events comprises: sensing a voltage at a point between a first terminal electrically connectable to a power source and a second terminal electrically connectable to a load; detecting a power quality event in power flowing between the first terminal and the second terminal based on the sensed voltage; and opening a switch electrically connected between the first and second terminals based on the detected power quality event.

In accordance with other aspects of the disclosed concept, an electrical device comprises: a first terminal structured to electrically connect to a power source; a second terminal structured to electrically connect to a load; a voltage sensor electrically connected to a point between the first and second terminals and being structured to sense a voltage at the point between the first and second terminals; a buck converter electrically connected between the first terminal and the second terminal; and a control unit structured to detect a power quality event in the power flowing between the first and second terminals based on the sensed voltage and to control a duty cycle of the buck converter based on the detected power quality event.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
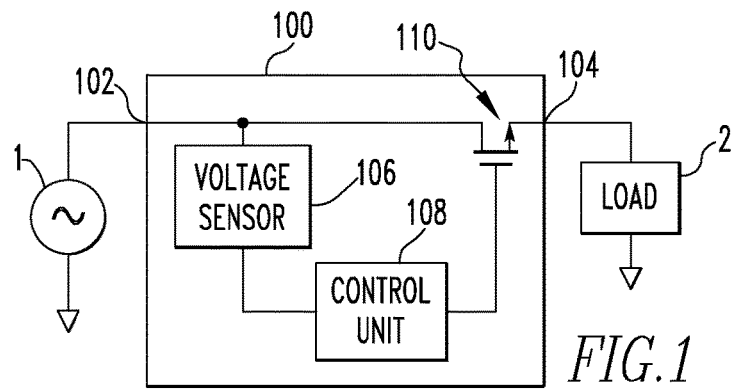
FIG. 1 is a schematic diagram of an electrical device including a voltage sensor and control unit in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the term "fault condition" shall mean an electrical current based fault that creates a risk of fire or personal shock. Fault conditions may include, without limitation, an overcurrent condition, an arc fault condition, and a ground fault condition. Fault conditions do not include transients, interruptions, sags, swells, waveform distortions, voltage fluctuations, or frequency variations.

As employed herein, the term "power quality event" shall mean a voltage based disturbance on the power line (e.g., conductors) that may potentially cause damage, reduced life, interrupted operation, or loss of data to electrical and electronic devices (i.e., loads) connected to the power line. Power quality events include, without limitation, transients, interruptions, sags, swells, waveform distortions, voltage fluctuations, and frequency variations.

As employed herein, the term "transients" shall mean voltage impulses caused by, without limitation, lightning, electrostatic discharge, or switching of inductive or capacitive loads. A typical voltage impulse is a high voltage (e.g., without limitation, 10 kV) for a short duration (e.g, without limitation, 50 ns).

As employed herein, the term "interruptions" shall mean a loss of power. The loss of power may be due to, without limitation, an open switch, a utility failure, or a component failure. In a typical interruption, there is zero voltage for more than one half of a cycle.

As employed herein, the term "sags" shall mean a reduction of the voltage of the power line. Sags may be due to, without limitation, startup of a load or the presence of a fault. A typical sag is, without limitation, less than 70% of rated voltage for more than one half of a cycle, or a sustained undervoltage (e.g., without limitation, less than 90% of rated voltage).

As employed herein, the term "swells" shall mean an increase in the voltage of the power line. Swells may be due to, without limitation, load changes or utility faults. A typical swell is, without limitation, greater than 120% of rated voltage for more than half of a cycle, or a sustained overvoltage (e.g., without limitation, greater than 110% of rated voltage).

As employed herein, the term "waveform distortions" shall mean the presence of any voltage content outside the fundamental power frequency (i.e., DC, 50 Hz, 60 Hz, etc.). Waveform distortions may include, without limitation, harmonics due to non-linear electronic loads (e.g., without limitation, power converters), DC offset due to faulty rectifiers, and high frequency noise due to, for example, power converter switching.

As employed herein, the term "voltage fluctuations" shall mean a voltage that varies over time beyond the intended voltage cycles of the fundamental power frequency. Voltage fluctuations may be caused by, for example, intermittent operation of load equipment. A typical voltage fluctuation is, without limitation, a fluctuation in voltage between 95% and 105% of the rated voltage at a rate of less than 25 Hz.

As employed herein, the term "frequency variations" shall mean a frequency that is not maintained at a constant value (e.g., without limitation, 50 Hz or 60 Hz). Frequency variations may be due to, without limitation, a standby or backup generator that is not governed properly.

FIG. 1 is a schematic diagram of an electrical device 100 in accordance with an example embodiment of the disclosed concept. The electrical device 100 includes a first terminal 102 structured to electrically connect to a power source 1 (e.g., without limitation, an AC or DC power source) and a second terminal 104 structured to electrically connect to a load 2.

The electrical device 100 includes a voltage sensor 106 that is electrically connected to a point between the first terminal 102 and the second terminal 104. The voltage sensor 106 is structured to sense a voltage at the point between the first terminal 102 and the second terminal 104.

The electrical device 100 also includes a control unit 108. The control unit 108 is structured to determine if a power quality event occurs in the power flowing between the first terminal 102 and the second terminal 104 based on the voltage sensed by the voltage sensor 106. Power quality events include, for example, transients, interruptions, sags, swells, waveform distortions, voltage fluctuations, and frequency variations. It will be appreciated that the control unit 108 may be capable of detecting one power quality event, a subset of the power quality events, or all of the power quality events without departing from the scope of the disclosed concept. For example and without limitation, in one example embodiment of the disclosed concept, the control unit 108 is capable of detecting transients and swells. In another example embodiment of the disclosed concept, the control unit 108 is capable of detecting transients, interruptions, sags, and swells. In yet another example embodiment of the disclosed concept, the control unit 108 is capable of detecting transients, interruptions, sags, swells, waveform distortions, voltage fluctuations, and frequency variations.

The control unit 108 may include a processor and a memory. The processor may be, for example and without limitation, a microprocessor, a microcontroller, or some other suitable processing device or circuitry, that interfaces with the memory. The memory can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. It is also contemplated that the control unit 108 may be implemented in circuitry without the use of a processor or memory.

The electrical device 100 further includes a switch 110 electrically connected between the first terminal 102 and the second terminal 104. When the switch 110 is open, the first terminal 102 and the second terminal 104 are electrically disconnected. When the switch 110 is closed, the first terminal 102 and the second terminal 104 are electrically connected. The control unit 108 is structured to control the state of the switch 110 based on the detected power quality event. For example and without limitation, the control unit 108 may be structured to open the switch 110 when a swell is detected and to close the switch 110 after the swell is completed.

The switch 110 may be any suitable type of electrically controlled switch. In some example embodiments of the disclosed concept, the switch 110 is a solid state switch (e.g., without limitation, a transistor). Solid state switches provide a fast switching time which allow the switch 110 to open quickly in the case of a power quality event, thus protecting the load 2 from damage.

Conventional surge protection devices can provide protection against transients where the voltage is greater than 140% of nominal voltage for up to 3 ms. However, conventional surge protection devices do not provide protection against swell of greater than 120% of nominal voltage for more than 3 ms or greater than 110% of nominal voltage for more than 0.5 s. These types of swells are in a range than can cause damage to equipment. The electrical device 100 of FIG. 1 can provide low cost protection from these types of swells by opening the switch 110 when the swell is detected. Although the interruption due to opening the switch 110 may be inconvenient in some circumstances, the electrical device 100 prevents damage to the load 2.

Figure 2:
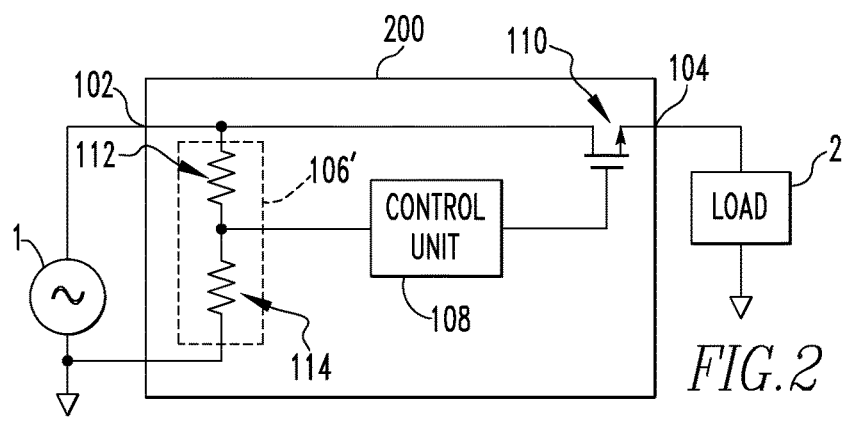
FIG. 2 is a schematic diagram of an electrical device including a voltage sensor shown in detail in accordance with an example embodiment of the disclosed concept.

Referring to FIG. 2, an electrical device 200 in accordance with an example embodiment of the disclosed concept is shown. The electrical device 200 of FIG. 2 is similar to the electrical device 100 of FIG. 1. However, in the electrical device 200 of FIG. 2, a voltage sensor 106' in accordance with an example embodiment of the disclosed concept is shown in more detail.

The voltage sensor 106' includes a first resistor 112 and second resistor 114. The first resistor 112 has a first end electrically connected to the point between the first terminal 102 and the second terminal 104 and a second end electrically connected to a first end of the second resistor 114. As noted above, the first end of the second resistor 114 is electrically connected to the second end of the first resistor 112. A second end of the second resistor 114 is electrically connected to a neutral. The second end of the first resistor 112 and the first end of the second resistor 114 are electrically connected to the control unit 108 so that the control unit 108 may receive the voltage sensed by the voltage sensor 106'.

Figure 3:
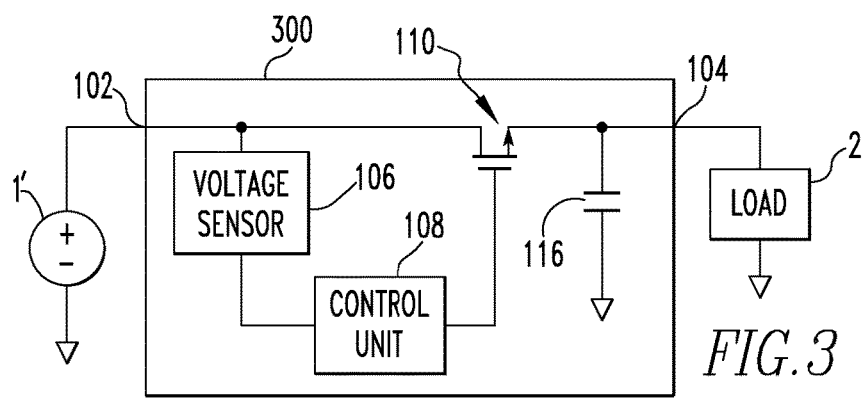
FIGS. 3 and 4 are schematic diagrams of electrical devices including capacitors in accordance with example embodiments of the disclosed concept.

FIG. 3 is a schematic diagram of an electrical device 300 in accordance with another example embodiment of the disclosed concept. The electrical device 300 of FIG. 3 is similar to the electrical device 100 of FIG. 1. However, the electrical device 300 of FIG. 3 includes a capacitor 116 electrically connected between the switch 110 and the second terminal 104 and a DC power source 1'. The capacitor 116 is structured to provide power to the load 2 for a period of time after the switch 110 opens. The capacitor 116 allows the load 2 continue operating even if the switch 110 is opened briefly due to an interruption or other power quality event. In one example embodiment, the capacitor 116 is able to support a current of 15 A for 20 ms. However, it is contemplated that any suitable capacitor 116 may be employed. As previously mentioned, an interruption due to opening the switch 110 may be inconvenient. Thus, the addition of the capacitor 116 may remove that inconvenience.

Figure 4:
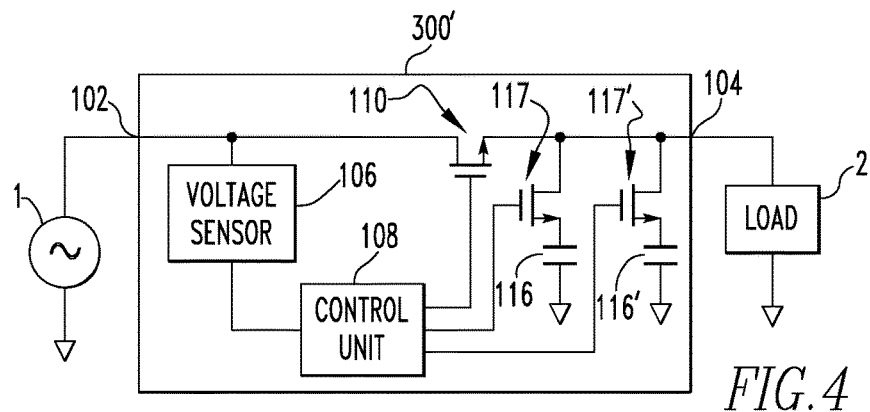

FIG. 4 is a schematic diagram of an electrical device 300' in accordance with another example embodiment of the disclosed concept. The electrical device 300' of FIG. 4 is similar to the electrical device 300 of FIG. 3. However, the electrical device 300' of FIG. 4 further includes a second capacitor 116' and switches 117,117' associated with the capacitors 116,116'. The capacitors 116,116' and switches 117,117' form a switched capacitor circuit. The switches 117,117' may be controlled by the control unit 108. The switched capacitor circuit facilitates use of the electronic device 300' in AC applications. During the positive half cycle, the switch 117 is closed during increasing voltage and the other switch 117' is open, and during the negative half cycle, the switch 117 is open and the other switch 117' is closed during increasing voltage. This allows the capacitors 116,116' to charge. When the switch 110 is opened based on a power quality event, the control unit 108 then controls switches 117,117' to open and close at appropriate times to deliver AC power to the load 2. Thus, the electrical device 300 of FIG. 3 allows the load 2 to continue operating even if the switch 110 is opened briefly due to an interruption or other power quality event in DC applications and the electrical device 300' allows the load 2 to continue operating even if the switch 110 is opened briefly due to an interruption or other power quality event in AC applications.

Figure 5:
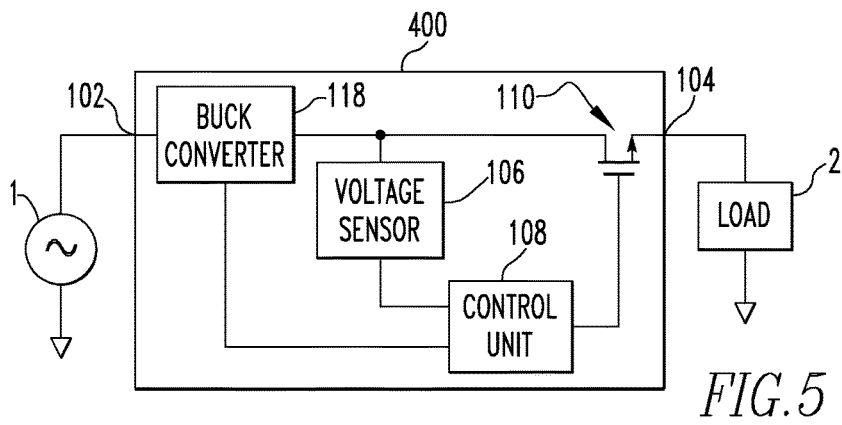
FIGS. 5-7 are schematic diagrams of electrical devices including a buck converter in accordance with example embodiments of the disclosed concept.

FIG. 5 is a schematic diagram of an electrical device 400 in accordance with another example embodiment of the disclosed concept. The electrical device 400 of FIG. 5 is similar to the electrical device 100 of FIG. 1. However, the electrical device 400 of FIG. 5 includes a buck converter 118 electrically connected between the first terminal 102 and the second terminal 104. The control unit 108 is structured to control a duty cycle of the buck converter 118 based on the detected power quality event. For example and without limitation, when no power quality events are detected, the control unit 108 may control the buck converter 118 at a 100% duty cycle. On the other hand, when a swell is detected, the control unit 108 may reduce the duty cycle of the buck converter 118 which lowers the output voltage of the buck converter 118. It is contemplated that the electrical device 400 of FIG. 5 may reduce the duty cycle of the buck converter 118 in response to swells rather than opening the switch 110, thus avoiding an interruption of power due to swells. It is also contemplated that the control unit 108 may reduce the duty cycle of the buck converter to 0% in the case that the power quality event warrants cutting off power to the load 2. It is further contemplated that in some embodiments of the disclosed concept, the switch 110 may be disposed between the buck converter 118 and the second terminal 104. A buck converter 118' in accordance with an example embodiment of the disclosed concept will be described in more detail with respect to FIG. 6.

Figure 6:
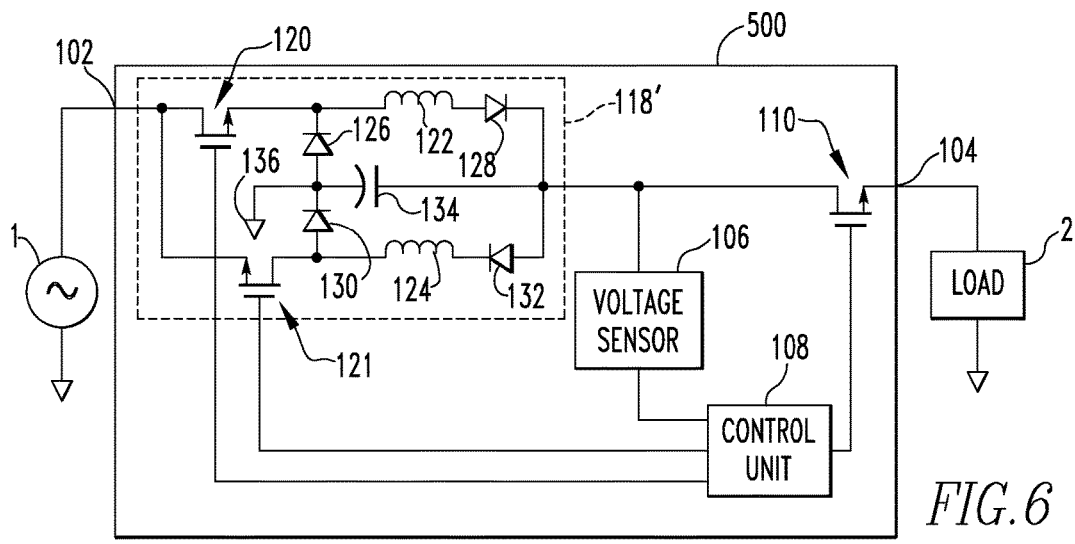

FIG. 6 is a schematic diagram of an electrical device 500 in accordance with an example embodiment of the disclosed concept. The electrical device 500 of FIG. 6 is similar to the electrical device 400 of FIG. 5. However, the electrical device 500 of FIG. 6 includes a buck converter 118' in accordance with an example embodiment of the disclosed concept shown in more detail.

The buck converter 118' includes first and second switches 120,121, first and second inductors 122,124, first through fourth diodes 126,128,130,132, and a capacitor 134. The first and second switches 120,121 are solid state switches (e.g., without limitation, transistors). The first and second switches 120,121 are electrically connected to the first terminal 102 and theirs states are controlled by the control unit 108.

The buck converter 118' includes parallel branches. The first branch includes the first switch 120, the first inductor 122, and the first and second diodes 126,128. The second branch includes the second switch 121, the second inductor 124, and the third and fourth diodes 130,132. The capacitor 134 is common to both branches.

In the first parallel branch, the first diode 126 is electrically connected between the first switch 120 and a neutral 136. The first diode 126 serves as a flyback to protect the first switch 120 from extreme voltages when the first switch 120 turns off. The first inductor 122 and the capacitor 134 act as filters to smooth the flow of current and the output voltage of the buck converter 118'. When the first switch 120 is off, the first inductor 122 draws current from the neutral 136. The current flows through the second diode 128 to the output of the buck converter 118' during positive half cycles of an AC cycle when the buck converter 118' is electrically connected to an AC power source.

In the second parallel branch, the third diode 130 is electrically connected between the second switch 121 and the neutral 136. The third diode 130 serves as a flyback to protect the second switch 121 from extreme voltages when the second switch 121 turns off. The second inductor 124 and the capacitor 134 act as filters to smooth the flow of current and the output voltage of the buck converter 118'. When the second switch 121 is off, the second inductor 124 draws current from the neutral 136. The current flows through the fourth diode 132 to the output of the buck converter 118' during negative half cycles of an AC cycle when the buck converter 118' is electrically connected to an AC power source.

The parallel branches of the buck converter 118' allow it to efficiently operate when electrically connected to an AC power source. However, when the buck converter 118' is electrically connected to a DC power source, some of the components may be omitted. In particular, the second switch 121, the second inductor 124, and the third and fourth diodes 130,132 (i.e., the second branch) as well as the second diode 128 may be omitted when the buck converter 118' is electrically connected to a DC power source as the second branch of the buck converter 118' is not needed.

Figure 7:
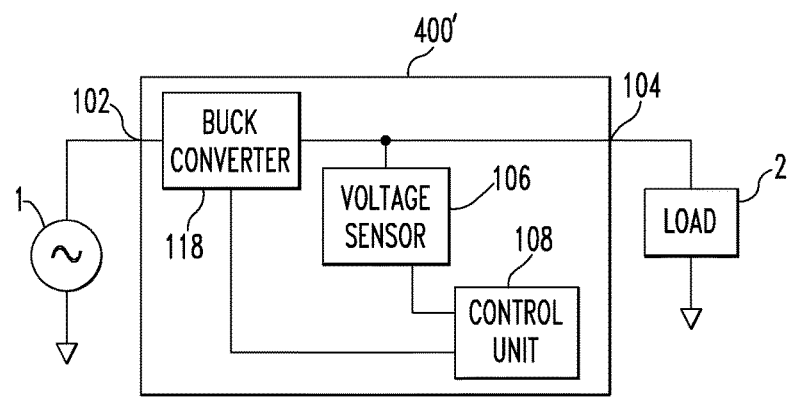

FIG. 7 is a schematic diagram of an electrical device 400' in accordance with an example embodiment of the disclosed concept. The electrical device 400' of FIG. 7 is similar to the electrical device 400 of FIG. 5. However, in the electrical device 400' of FIG. 7, the switch 110 is omitted. The control unit 108 may reduce the duty cycle of the buck converter 118 based on power quality events. Furthermore, reducing the duty cycle of the buck converter 118 to 0% cuts off power to the load 2.

Figure 8:
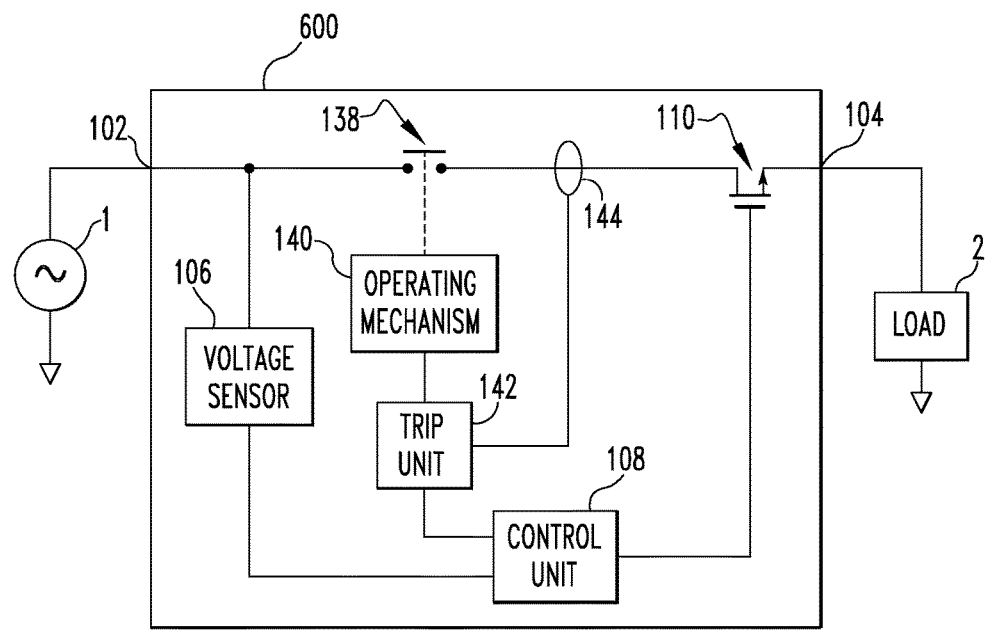
FIG. 8 is a schematic diagram of a circuit interrupter including a voltage sensor and control unit in accordance with an example embodiment of the disclosed concept.

FIG. 8 is a schematic diagram of a circuit interrupter 600 in accordance with an example embodiment of the disclosed concept. The circuit interrupter 600 includes first and second terminals 102,104, a voltage sensor 106, a control unit 108, and a switch 110 similar to the electrical device 100 of FIG. 1. However, the circuit interrupter further includes separable contacts 138, an operating mechanism 140, and a trip unit 142.

The separable contacts 138 are electrically connected between the first terminal and second terminals 102,104 and are movable between a closed position and an open position. When both the separable contacts 138 and the switch 110 are closed, the first and second terminals 102,104 are electrically connected. When either of the separable contacts 138 and the switch 110 are open, the first and second terminals 102,104 are electrically disconnected. The operating mechanism 140 is a device structured to trip open the separable contacts 138.

The trip unit 142 is structured to detect a fault condition based on input from the current sensor 144 or other sensors. The fault condition may include, without limitation, an over current, a short circuit, a ground fault, or an arc fault. Based on detection of a fault condition, the trip unit 142 controls the operating mechanism 140 to trip open the separable contacts 138.

The trip unit 142 may include a processor and memory. The processor may be, for example and without limitation, a microprocessor, a microcontroller, or some other suitable processing device or circuitry, that interfaces with the memory. The memory can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. It is also contemplated that the trip unit 142 may be implemented in circuitry without the use of a processor or memory. It is also contemplated that other types of trip mechanisms such as, without limitation, thermal or magnetic trip mechanisms may be employed in place of or in addition to the trip unit 142.

By virtue of the separable contacts 138, the operating mechanism 140, and the trip unit 142, the circuit interrupter 600 is able to provide protection from fault conditions. By virtue of the voltage sensor 106, the control unit 108, and the switch 110, the circuit interrupter 600 is also able to provide protection from power quality events.

In some embodiments of the disclosed concept, the trip unit 142 does not control the operating mechanism 140 to immediately trip open the separable contacts 138 upon detection of a fault condition, but rather waits a period of time associated with that type of fault condition before controlling the operating mechanism 140 to trip open the separable contacts 138. Based on the detection of power quality events, the control unit 108 may change the periods of time associated with fault conditions in the trip unit 142. For example and without limitation, when the control unit 108 detects large frequency fluctuations, it may indicate that the power source is a less reliable source such as a generator.

In response, the control unit 108 may reduce the periods of time associated with fault conditions in the trip unit 142 to cause the trip unit 142.

Although the circuit interrupter 600 is disclosed in relation to one phase, it is contemplated that the circuit interrupter 600 may be employed in relation to multiple phases and separable contacts me be associated with each phase.

It is contemplated that the disclosed concept may be employed in a variety of types of devices such as, without limitation, circuit breakers, meters, receptacles, and power strips.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical device comprising:
   a first terminal structured to electrically connect to a power source;
   a second terminal structured to electrically connect to a load;
   a voltage sensor electrically connected to a point between the first and second terminals and being structured to sense a voltage at the point between the first and second terminals;
   a switch electrically connected between the first terminal and the second terminal;
   a control unit structured to detect a power quality event in the power flowing between the first and second terminals based on the sensed voltage and to control a state of the switch based on the detected power quality event;
   separable contacts electrically connected between the first terminal and the second terminal and being moveable between a closed position and an open position;
   an operating mechanism structured to trip open the separable contacts; and
   a trip unit structured to detect a fault condition based on the power flowing between the power source and the load and to control the operating mechanism to trip open the separable contacts based on the detected fault condition,
   wherein opening the separable contacts or the switch electrically disconnects the first and second terminals,
   wherein the trip unit is structured to wait a predetermined time associated with the detected fault condition after detecting the fault condition before controlling the operating mechanism to open the separable contacts,
   wherein the control unit is structured to change the predetermined time associated with the detected fault condition based on the detected power quality event, and
   wherein the power quality event includes at least one of a transient and a swell.

2. The electrical device of claim 1, wherein the control unit is structured to control the switch to open when the power quality event is detected and to close after the power quality event has ended.

3. The electrical device of claim 1, wherein the switch is a solid state switch.

4. The electrical device of claim 1, further comprising:
a capacitor electrically connected at a point between the switch and the second terminal,
wherein the capacitor is structured to provide power to the load for a period of time when the switch is open.

5. The electrical device of claim 1, wherein the electrical device is one of a circuit breaker, a meter, a receptacle, and a power strip.

6. The electrical device of claim 1, wherein the fault condition is one of an overcurrent, a short circuit, a ground fault, and an arc fault.

7. The electrical device of claim 1, further comprising:
a buck converter electrically connected between the first terminal and the second terminal,
wherein the control unit is structured to control a duty cycle of the buck converter based on the detected power quality event.

8. The electrical device of claim 7, wherein the power source is an alternating current power source; and wherein the buck converter includes a first branch that is operable during a positive half cycle of the power source and a second branch that is operable during a negative half cycle of the power source.

9. The electrical device of claim 1, wherein the voltage sensor includes a first resistor and a second resistor; wherein the first resistor has a first end electrically connected to a point between the first and second terminals and a second end electrically connected to the second resistor; and wherein the second resistors has a first end electrically connected to the first resistor and a second end electrically connected to a neutral.

10. The electrical device of claim 1, wherein the control unit is structured to sense transients and swells.

11. The electrical device of claim 1, wherein the control unit is structured to sense transients, interruptions, sags, and swells.

12. The electrical device of claim 1, wherein the control unit is structured to sense transients, interruptions, sags, swells, waveform distortion, voltage fluctuations, and frequency variations.

13. A method of providing protection from power quality events, the method comprising:
sensing a voltage at a point between a first terminal electrically connectable to a power source and a second terminal electrically connectable to a load;
detecting a power quality event in power flowing between the first terminal and the second terminal based on the sensed voltage;
opening a switch electrically connected between the first and second terminals based on the detected power quality event;
detecting a fault condition in the power flowing between the first and second terminals;
opening a set of separable contacts electrically connected between the first and second terminals based on the detected fault condition;
waiting a predetermined time associated with the detected fault condition after detecting the fault condition before opening the separable contacts; and
changing the predetermined time associated with the detected fault condition based on the detected power quality event,
wherein the power quality event includes at least one of a transient and a swell.

14. The method of claim 13, further comprising:
closing the switch after the power quality event has ended.

15. The method of claim 13, further comprising:
providing a capacitor electrically connected at a point between the switch and the second terminal,
wherein the capacitor is structured to provide power to the load for a period of time when the switch is open.

16. The method of claim 13, further comprising:
providing a buck converter electrically connected between the first terminal and the second terminal; and
controlling a duty cycle of the buck converter based on the detected power quality event.

* * * * *